United States Patent [19]
Barabash et al.

[11] Patent Number: 5,263,127
[45] Date of Patent: Nov. 16, 1993

[54] METHOD FOR FAST RULE EXECUTION OF EXPERT SYSTEMS

[75] Inventors: William Barabash, Acton; Steven A. Kirk, Chelmsford; William S. Yerazunis, Marlboro; Kenneth A. Gilbert, Harvard, all of Mass.

[73] Assignee: Digital Equipment Corporation, Maynard, Mass.

[21] Appl. No.: 724,556

[22] Filed: Jun. 28, 1991

[51] Int. Cl.⁵ ............................................. G06F 15/18
[52] U.S. Cl. ...................................... 395/60; 395/64
[58] Field of Search ........................................ 395/64

[56] References Cited

U.S. PATENT DOCUMENTS 4,965,882 10/1990 Barabash et al. .................... 364/513
5,129,037 7/1992 Kirk et al. ............................... 395/22

OTHER PUBLICATIONS

Forgy, C. L., "Rete: A Fast Algorithm for the Many Pattern/Many Object Pattern Match Problem", Artificial Intelligence, 1982, 17-37.

Parson et al., "Constant-time pattern matching for real-time production systems", SPIE vol. 1095, 1989, 971-982.

Primary Examiner—Allen R. MacDonald
Assistant Examiner—Robert W. Downs
Attorney, Agent, or Firm—Kenneth F. Kozik; Denis G. Maloney; Barry N. Young

[57] ABSTRACT

The present invention includes an approach to improving run-time performance of rule-based systems. A series of testing element nodes making up a testing element is adapted to a match discrimination network utilized in an expert system to permit scanning of incoming data prior to traversing large segments of the nodes in the match discrimination network. By placing a series of testing element nodes into a traditional match discrimination network, interaction among data objects and nodes of the match discrimination network are minimized.

11 Claims, 13 Drawing Sheets

RULE (P ASSIGN-PRIVATE-ROOM
    (STUDENT^NAME<SOME-NAME>
        ^PLACED-IN NIL^SPECIAL-CONSIDERATION? YES)
    (ROOM^NUMBER<ROOM-NUMBER>^CAPACITY 1
        ^VACANCIES 1)

-->
.
.
.)

WORKING MEMORY 41 (STUDENT^NAME DAWN^SEX-IS FEMALE^PLACED-IN NIL
    ^SPECIAL-CONSIDERATION? YES)
52 (STUDENT^NAME PETER^SEX-IS MALE^PLACED-IN NIL
    ^SPECIAL-CONSIDERATION? YES)
9  (ROOM^NUMBER 221^CAPACITY 1^VACANCIES 1)
12 (ROOM^NUMBER 346^CAPACITY 1^VACANCIES 1)
17 (ROOM^NUMBER 761^CAPACITY 1^VACANCIES 1)

INSTANTIATIONS

ASSIGN-PRIVATE-ROOM 41 9
ASSIGN-PRIVATE-ROOM 41 17
ASSIGN-PRIVATE-ROOM 52 9
ASSIGN-PRIVATE-ROOM 52 17

FIG. 2

RULE

```
(P PLACE-IN-PARTIALLY-FILLED-ROOM
     (STUDENT^PLACED-IN NIL^SEX-IS <M/F>
         ^SMOKER? <SMOKE>
     (ROOM^NUMBER <ROOM-NUMBER> ^CAPACITY <MAX>
         ^VACANCIES {>0<<MAX>}
         ^SEXES-ARE <M/F> ^SMOKERS? <SMOKE>)
-->
  ....)
```

WORKING MEMORY

4  (STUDENT^NAME LEE^PLACED-IN NIL^SEX-IS MALE^SMOKER? YES)
12 (STUDENT^NAME KIP^PLACED-IN NIL^SEX-IS MALE^SMOKER? NO)
15 (STUDENT^NAME CINDY^PLACED-IN NIL^SEX-IS FEMALE^SMOKER? NO)
7  (ROOM^NUMBER 121^CAPACITY 2^VACANCIES 1^SEXES ARE MALE
        ^SMOKERS? YES)
9  (ROOM^NUMBER 355^CAPACITY 4^VACANCIES 2^SEXES ARE MALE
        ^SMOKERS? NO)
3  (ROOM^NUMBER 197^CAPACITY 3^VACANCIES 0^SEXES ARE MALE
        ^SMOKERS? YES)

INSTANTIATIONS

PLACE-IN-PARTIALLY-FILLED-ROOM 4 7
PLACE-IN-PARTIALLY-FILLED-ROOM 12 9

FIG. 3

METHOD FOR FAST RULE EXECUTION OF EXPERT SYSTEMS

FIELD OF THE INVENTION

The present invention relates generally to rule-based programmed computer systems that utilize reticular discrimination networks and, more particularly, to arrangements and techniques for avoiding the traversal of large segments of the network.

OTHER PUBLICATIONS

D. Michie (ed.), *Expert Systems in the Microelectronic Age*, pp. 3–25, 1979. Charles L. Forgy and Susan J. Shepard, RETE; a fast match algorithm, AI Expert, 1987. Thomas Cooper and Nancy Worgin, *Rule-based Programming with OPS5*, Morgan Kaufmann Publishers, 1988.

BACKGROUND OF THE INVENTION

Expert systems involve methods and techniques for constructing human-machine systems with specialized problem-solving expertise. The pursuit of this area of artificial intelligence research has emphasized the knowledge that underlies human expertise and has simultaneously decreased the apparent significance of domain-independent problem-solving theory.

One of the best known expert system languages is the OPS5 language developed at Carnegie Mellon University in 1975 by Charles Forgy, John McDermott, Allen Newell, and Michael Rychner; OPS5 falicitates approaches to problem solving and knowledge representation. An typical rule-based language like OPS5 consists of three components:

1. Rule memory (also called production memory) A collection of rules that make up the "program"
2. Working memory. The database that holds the data elements or data records that are matched to and manipulated by the rules.
3. Rule interpreter. The machinery for matching elements in working memory to rules and for choosing the rule to execute.

Working memory represents the state of computation of an OPS5 program. It is composed of the set of all working memory elements (WMEs). Using English grammar as an example, each grammar symbol, such as the letter S, could be represented in OPS5 by a WME. In practice, however, a WME typically contains many symbols. Thus, the state of working memory in OPS5 is defined by the WMEs and by their contents at a given point in time.

To illustrate various principles in greater depth, a room-assignment problem can be considered. The goal of this problem is to assign students to temporary housing in an apartment complex while they attend training courses of various lengths. Assume that the apartments vary by the number of occupants they accommodate. There are four sizes: singles, doubles, triples, and quads. Further assume that it is most economical to fill the largest apartments first.

There are two factors taken into consideration when placing students in the same room: the students must be of the same gender, and they must either all be smokers or all be nonsmokers.

Working memory is defined by both the structure of its WMEs and their contents. Each element in working memory is an instance of an element class. An element class is identified by a class name and by a set of attributes that refer to relevant features that describe the class. For the room assignment problem, the two main entities that are manipulated are students and the rooms to which they are assigned. From these entities one can define the element classes student and room.

The attributes for the student element class hold information about the student such as the student's name, gender, and whether or not they are a smoker. These are facts about the student that are known and given to the program as input.

As previously mentioned, working memory contains instances of element classes called working memory elements, or WMEs. Each WME consists of a class name and attributes, each of which has a value associated with it. The following is an example of a room WME:

| (ROOM | NUMBER 213 |
|---|---|
| | CAPACITY 3 |
| | VACANCIES 1 |
| | SEXES-ARE MALE |
| | SMOKERS? YES) |

Attribute names are distinguished from their values by a preceding caret character ( ^ ). Each WME is enclosed in parentheses. The above room WME represents room number 213 which can hold three people. From the value of the ^vacancies attribute, it can be seen that there is only one space left in the room. The two current occupants of the room are male and are smokers.

OPS5 rules are independent entities, each written to execute when a set of WMEs is found that match the rules' conditions. Rules cannot pass data to each other, cannot direct when another should execute, and cannot specify their own time to execute. They can execute only when each condition within the rule is matched by a WME, and are chosen to execute by the rule interpreter. A sample rule template in the OPS5 language would be the following:

```
(p rule-name
   (condition-element)
   .
   .                              left-hand side (LHS)
   .
   →
   (action)
   .
   .                              right-hand side (RHS)
   .
)
```

In an actual rule, the names rule-name, condition-element, and action are replaced with entities of that type. The three dots indicate that the preceding element can be repeated.

The two major parts of a rule are the left-hand side (LHS), which precedes the arrow (→), and the right-hand side (RHS), which follows it. The expressions on the LHS are called condition elements. Each condition element states a set of constraints that a WME must satisfy in order to match that condition element. For a rule to be satisfied, all positive condition elements must be matched, and no negated condition elements must be matched. Negated condition elements are identified by a minus sign preceding a condition element. When a rule is matched and is chosen to execute, the expressions in the RHS, called actions, each perform some activity.

The indicated actions usually affect the state of working memory.

The rule interpreter matches WMEs to rules, selects a rule that is eligible to execute, and executes the actions on the selected rule's RHS. The rule interpreter does these tasks by utilizing a recognize-act cycle algorithm. Each pass of the recognize-act cycle consists of three steps:
1. Match. Match all the WMEs against all the condition elements in all the rules. Evaluate the LHSs of the rule to determine which are satisfied given the current contents of working memory. Output is the conflict set. If no rules have satisfied the LHS, return control to the user.
2. Select. Select one rule with matching WMEs from the conflict set.
3. Act. Perform the actions on the RHS of the selected rule.

Before briefly discussing each of the steps in the recognized-act cycle, some terminology must be introduced.

An instantiation is a set of WMEs that satisfies all of the condition elements in a rule. That is, together they form a complete match of the positive condition elements of the rule. One can think of an instantiation as an instance of a matched rule. The set of instantiations collected as a result of the match step is called the conflict set. The process of selecting a single instantiation from the conflict set is called conflict resolution.

FIG. 1 illustrates the recognize-act cycle using these terms that is taught by the prior art.

In the recognize-act cycle, working memory 499 is divided into WMEs 500. WMEs 500 are identified by their time tag. A time tag is a number OPS5 assigned to each WME when that WME is created or modified, so that the WME has a unique identifier that indicates its most recent modification. Each time tag assigned is larger than the previous one was, although the time tags are not necessarily consecutive. Time tags can not be referred to or manipulated from within rules. Time tags are used only in the recognize-act cycle as a shorthand notation for referring to the WMEs themselves and as a basis for conflict resolution.

An instantiation is represented by a rule name and by the time tags of the WMEs that match each condition element. The time tags are listed in the order of the condition elements they match. Referring to FIG. 2, in the instantiation for the rule names assign-private-room, both of the WMEs in student element class with the time tags 41 and 52 both match the first positive condition element, and the WMEs with the time tags 9 and 17 match the second positive condition element. The WME with the time tag 12 matches only one of the constraints in the second positive condition element and therefore is not an instantiation.

Returning to FIG. 1, a rule is considered successfully matched 502 when all of its positive condition elements are matched by WMEs and there are no WMEs in working memory that match the rule's negated condition elements. The result of a successful match is an instantiation 504. In the example set forth in FIG. 2, there are two condition elements in the rule assign-private-room, i.e., student ^name and room ^number. In addition, there are five working memory elements with time tags 41, 52, 9, 12, and 17, two of the element class student, and three of the element class room.

Consider the first working memory element with time tag 41 and the condition element student ^name. For the WME to be matched to that condition element, the WME must first have the class name student. Second, the value of the WME's ^placed-in attribute must be equal to the value nil. Assuming this is the first use of variable <student-name> in the rule, that variable matches.

To understand what happens during match, one can decompose the process into three steps. In the first, called constant test, the value of the attribute is tested against a constant within the condition element. A special case is a test of the class of the WME against the class of the condition element. In the second step, intra-element match, (also known as intra-object tests) refer to matches between multiple attribute slots within a single condition element. The interelement match, (also known as inter-object tests) compares between WMEs that match different condition elements of the same rule. Interelement match ensures that variables with the same name in different condition elements refer to the same values.

When there are no variables shared by different condition elements on the LHS, as in the rule of FIG. 2, an instantiation is formed from each possible combination of the WMEs matching each condition element. (If a rule with two condition elements has one condition element matched by M WMEs and another matched by N WMEs, and there are no variables shared between the two condition elements, there will be M×N instantiations of that rule.) For example, FIG. 2 contains the LHS of a rule, a set of WMEs matching, and the instantiations that are formed. A WME that matches the first condition element can be combined with a WME that matches the second condition element to form an instantiation. In FIG. 2, the the constant test matches student WMEs 41 and 52 with the first student condition element, and room WMEs 9 and 17 with the second room condition element. WME 12 does not match the second room condition element, because its compacity slot has the value 2.

The interelement match finds four instantiations for the rule assign-private-room result: 41 with 9, 41 with 17, 52 with 9 and 52 with 17. Returning to FIG. 1, instantiations are placed in a conflict set 506. One instantiation 508 results in the execution of the prescribed act 510.

Usually, there are variables that are used in more than one condition element on the LHS (usually called shared variables), so the number of instantiations is restricted by the requirement that variables with the same name must be bound to the same value. FIG. 3 illustrates the instantiations formed with shared variables.

In FIG. 3, although there are three matches to the first condition element (4,12, and 15), and two matches to the second (7 and 9, but not 3), only two instantiations are formed. This is because the variables for the attributes sex-is and smoker? in the student WME must match the same values in the room WME. So, despite the number of matches that result from intraelement match, the number of instantiations is less than that in the previous example because of interelement match.

Even with the simple rule in FIG. 3, the match process can be complicated for a human to simulate. OPS5 performs this match efficiently using the "many-pattern many-object match algorithm," a term used by Forgy in RETE; a fast match algorithm, AI Expert, 1987, to refer to the matching algorithm implemented as the basis of OPS5.

One factor in OPS5's efficiency is that the conflict set is not recomputed each cycle. The results of both intraelement and interelement matches are stored. Only changes to working memory caused by the execution of a rule must be propagated to through intraelement and interelement tests the conflict set each cycle. Any instantiations that are not affected by the WMEs that are modified after a rule executes remain unchanged in the conflict set and thus require no recomputation.

The result of the match step is a conflict set that contains all the instantiations that are eligible for execution. During the conflict-resolution step a single instantiation is chosen to execute. The decision criteria and the method used to choose that one instantiation rule are called a conflict resolution strategy.

There are many strategies a rule-based system can employ in choosing an instantiation from the conflict set, such as the first rule to enter the conflict set, or the rule with the highest priority number associated with it. In OPS5, conflict resolution is based on the following criteria in the order listed below:

Refraction. The same instantiation is never executed more than once. (The word refraction is from the use of the word in the neurosciences. The refractory period is the time period after a neuron fires during which that same neuron cannot fire again.)

Recency. The instantiation whose condition elements are matched by the most recent WMEs is chosen over all others. Recency is determined by a WME's time tag; WMEs that have the highest time tags are the most recent. For example, in FIG. 2., a conflict between instantiations might be resolved by placing DAWN (WME 41) in room 761 (WME 17) rather than room 221 (WME 9) because time tag 17 is greater than time tag 9. As a refinement, OPS5 allows and alternative conflict resolution strategy that considers the time tag of the first condition element as more important than the time tags of the subsequent condition element.

Specificity. The instantiation of a rule with a more specific LHS is also given priority. A more specific LHS is one that contains more tests between condition elements and WMEs.

Arbitrary choice. When all the preceding criteria fail to select a single instantiation, an instantiation must be chosen at random.

To speed up the execution of an OPS5 program, focus on the activity that takes the most CPU time is required. As mentioned previously, the OPS5 recognize-act cycle comprises three phases: match, conflict resolution, and act. Of these three phases, the match phase is by far the most expensive, accounting for more than 90 percent of execution time in some programs. Therefore, to maximize the efficiency of an OPS5 program, an understanding of how OPS5 matches WMEs to rules is required.

During the match phase of the recognize-act cycle, every WME is compared to every condition element in every rule. Assume a program with 100 WMEs, and 100 rules that each have approximately five condition elements-not a large program. During each match phase, this program would make 50,000 comparisons between WMEs and condition elements. An OPS5 implementation that computed all these matches each cycle would obviously spend most of its time in the match phase.

OPS5 is typically based on an efficient match algorithm called the RETE match algorithm as taught by Forgy. The RETE match algorithm trades space for time by saving the match state between recognize-act cycles. When a WME is created, it is compared with all condition elements in the program, and it is stored with each condition element to which it matches. Therefore, only incremental changes to working memory are matched on each cycle. Since a modify is typically performed by a remove and a make, modify is not specifically mentioned in this discussion about match activity.

To match WMEs efficiently, the conditions of all the OPS5 rules are coupled into a network of nodes. Each node represents one or more of the tests in a condition element. A test is a predicate operator with a constant, bound variable, or a disjunction of values. For example, one node might represent the test that the value of the attribute ^type is the symbol or.

$$^\wedge type = or\text{-}gate$$

The nodes are connected in the order in which the tests occur in the condition elements. So, the condition element (gate ^type=or-gate ^value<>true)

is compiled into the string of nodes as illustrated in FIG. 4, wherein the test WME-type=gate 512 is followed by the test ^type=or-gate 514, which is subsequently followed by the test ^value<>true 516.

If another condition element, such as (gate ^type or-gate ^value<>false)

is also compiled, it will share the first two test nodes (labeled 522 and 524) in the network, as illustrated in FIG. 5, wherein test WME-type=gate 518 is followed by test ^type=or-gate 520, which is followed by tests ^value<>true 522 and ^value<>false 524. When condition elements can share nodes in the network (node sharing), this reduces the number of redundant tests and, therefore, the number of nodes in the network. This is one factor in the RETE algorithm's efficiency.

A pointer to the new WME is passed to the network root node, which forwards a copy to all the top nodes in the network. Each node acts like a switch. When a node receives the WME pointer, it performs its test on the associated WME. If the WME passes the test at that node, the switch opens and the pointer drops through to the next nodes. If the WME value fails the test, the switch does not open and the WME cannot go further along that path. If the WME passes all test in a given path, it will be combined with WMEs matching other condition elements to form complete instantiations in the conflict set, as described in more detail below.

WME pointers are sent through the match network as tokens. A token contains pointers to one or more WMEs, and a status that indicates that the token originated from either a make or a remove action. A modify action typically causes a remove token and a make token to be sent through the match network. Tokens that have a make status are stored with condition elements they match; tokens with a remove status are deleted from condition elements with which they are stored.

Three types of match have been previously discussed: constant test, intraelement match and interelement match. Constant test is the comparison between WME values and the tests within the condition element against non-changing values, for example, a check to see whether a WME has the attribute and value ^type-=or-gate is a constant test. Intraelement test refer to multiple attribute slots within a single condition element such as the number of units available being greater or equal to the number of units ordered. Interelement match is the comparison between WMEs that match different condition elements of the same rule. Interelement match ensures that variables with the same name in different condition elements refer to the same values.

The two types of match are represented by different types of nodes in the match network. Referring to FIG. 4, constant and intraelement matches are performed by 1-input nodes (labeled 512, 514, and 516). Each node performs one of the tests specified in a condition element; a string of 1-input nodes represents all the constant and intraelement tests in the condition element. The name "1-input" refers to the fact that the work done in that node depends on one input into the node: a single token.

Variable consistency is handled by 1-input nodes only when the variable is used twice in the same condition element; the 1-input node tests that these values are consistent within the single condition element. For example, the condition element (customer ^
  balance <huge> ^credit-limit> <huge>)

would be compiled into the 1-input nodes

---
customer
  |
credit-limit >   balance
---

Interelement matches are performed by 2-input nodes. 2-input nodes combine the output of two 1-input nodes, performing interelement tests and producing consistent partial or full instantiations.

Consider the following rule and its compiled network form in FIG. 6,

---
(p propagator!or-true
;
; If an OR gate is found with a TRUE line input, set the gate
; value to TRUE as well.
;
    (task   name propagate)
    { <The-OR-gate>
      (gate  type or-gate  id <id>   value <> true) }
      (line  to <id>  value true)
    →
    (modify <The-OR-gate>  value true))
--- where the three condition elements from the element classes task 528, gate 530, and line 532 each compile into a string of 1-input nodes (numbered 534a, 534b, 534c, and 534d). Notice that there is no 1-input node for testing the values of the variable<id>in the second and third condition elements' tests.

2-input nodes check variable consistency across condition elements. The 2-input node (1 & 2) 536 in FIG. 6 forms every combination of WMEs that match the first condition element and those that match the second. Since there are no variables in common between these condition elements, the 2-input node 536 forms a cross-product of the two, and passes each of these pairs to the next 2-input node 538. Each token emitted from (1 & 2) 536 contains a pair of WMEs and a make or remove status.

The 2-input node (1&2)&3 538 in FIG. 6 receives tokens from node (1 & 2) 536, and from the last 1-input node compiled from the third condition element 534d. A token from this 1-input node 534d contains a pointer to a WME that successfully matched the third condition element. In node (1&2)&3 538, pointers to the WMEs matching the first two condition elements are combined with the pointer to the WME matching the third to form a token containing pointers to the three WMEs. This token represents an instantiation of the rule. To form a new token, node (1&2)&3 538 must determine that the value for the attribute ^id in the second WME is the same as the value for the attribute ^to in the third WME. This constraint, which comes from the use of the variable<id>in the second and third condition elements, limits the number of triplets formed.

Since there are no more condition elements, the resulting set of tokens becomes an instantiation and is placed in the conflict set. If there had been a fourth condition element in our example rule, the token emitted from node (1&2)&3 538 would have been the input to another 2-input node, (1&2&3)&4, which would try to combine the partial matches from the first three condition elements with every WME that matched the fourth condition element.

Each 2-input node has two memories-one each for storing tokens from its two inputs. An alpha memory holds tokens received from its 1-input node. Each token contains a pointer to a WME that successfully matched the condition element. A beta memory holds sets of tokens that were the result of the work of a previous 2-input node. These tokens contain pointers to WMEs that together form a consistent match to a group of condition elements earlier in the rule.

2-input nodes that join positive condition element matches to previous condition element matches are called AND nodes. FIG. 7 shows an AND node 540 and its associated token memories. Notice that the tokens represented coming into the right side of the node are always stored in alpha memory. The tokens represented entering the left side of the AND node 540 are alpha memory 542 when this AND node 540 is the first 2-input node in the network (because the input to the node at that time can be the result of only a 1-input node), but are beta memory at all other positions in the network (when their input is from the result of a previous 2-input node). This is sometimes referred as "right memory" and "left memory", to account for the fact that the left memory 544 may be either alpha or beta.

In FIG. 8, the first two condition elements in the rule propagate!or-true shown above compile into two strings of 1-input nodes (numbered 546, 548, and 554). The 2-input AND node labeled 1&2 550 accepts tokens from these two strings and stores them in two corresponding alpha memories (numbered 552a and 552b). The third condition element compiles into another string of 1-input nodes 554. The 2-input nodes (1&2)&3 556 then accepts tokens from this string from the right and stores them in its alpha memory 558. Node (1&2)&3 556 accepts tokens emitted from node 1&2 550 and stores them in the beta memory 560.

A 2-input node is activated whenever a token arrives from the right or from the left. When a token with a make status arrives, it is stored in the node's corresponding memory and then is compared with all tokens stored in the node's other memory. Each consistent match that occurs causes the node to combine the WME pointers in both tokens to form a new token, which is then passed to all successor nodes. If the original token arrives with a remove status, it goes through the same matching process as does a token with a make status, except that, rather than the token being stored in the token memory, it must be located and removed from the memory. The tokens emitted from a 2-input node are given the same status (remove or make) as the token that just arrived.

Up to this point, discussion has centered around the joining of positive condition elements. Negated condition elements require another type of 2-input node. The compilation of a negated condition element creates a NOT 2-input node 562, illustrated in FIG. 9.

The WMEs that match the string of 1-input nodes representing a negated condition element are represented by tokens stored in the NOT 2-input node's alpha memory 564. If a negated condition element does not contain any variables bound in other condition elements, the mere presence of a token in this alpha memory 564 ensures that no tokens from the left will pass through that 2-input node. If the negated condition element refers to variables bound in previous condition elements, however, the tokens stored in the alpha memory must be matched against the tokens in the left memory to see whether the negated element is consistently matched.

In FIG. 9, the memory on the left (either alpha or beta) 566 contains a negation count 557 with each token. This is a count of the number of tokens in the memory on the right that successfully match the left token, inhibiting that token from proceeding further in the network. The right memory 564 contains tokens that successfully matched the string of 1-input nodes representing the negated condition element.

When a new token arrives from the left 566, it is compared to all the tokens on the right 568. The number of consistent matches found is that token's negation count 557. The token and its negation count are then stored in the left memory. If the negation count is 0, then a copy of the token is emitted from the NOT node, representing a match of previous condition elements that was not inhibited by the negated condition element. If the negation count is greater than 0, then the token is not emitted. A token arriving from the left with a remove status will remove its corresponding make token from the left memory and will be emitted only if the negation count was 0.

Coming from the right, a token is stored (or removed if it has a remove status) and then is compared against all tokens in the left memory. Tokens that match have their negation count incremented if the right token has a make status, or decremented if the right token is being removed. If a negation count is incremented to 1, then the corresponding left tuple is emitted with a remove status since it is now being inhibited. If a negation count is decremented to 0, then the corresponding left tuple is emitted with a make status, since it is no longer being inhibited by a token on the right.

The picture of the RETE network that has been presented here is not yet complete. One saw earlier how 1-input nodes can be shared by two or more condition elements. Likewise, 2-input nodes can also be shared by two or more rules. As an example, let us use the two rules below, and the compiled RETE network for the rules in FIG. 10.

```
(p propagator!or-true
;
; If an OR gate is found with a TRUE line input, set the gate
; value to TRUE as well.
;
    (task    name propagate)
    (line    to <gate-id>    value true)
 { <The-OR-gate>
    (gate    id <gate-id>    type or-gate    value <> true) }
 →
    (modify <The-OR-gate>    value true))
(p propagator!not-false
;
; If a NOT gate is found with a TRUE line input, set the gate
; value to FALSE if it is not already FALSE.
;
    (task    name propagate)
    (line    to <gate-id>    value true)
 { <The-NOT-gate>
    (gate    id <gate-id>    type not-gate    value <>false) }
 →
    (modify <The-NOT-gate>    value false))
```

These rules share both 1-input (numbered 576a–f) and 2-input nodes (numbered 578a–c). Since both rules share intraelement tests on the first two condition elements (570 and 572), they also share 1-input nodes in the match network. The third condition element 574 in each rule differs after the WME class is tested, so only one 1-input node can be shared-the one that tests that the WME class is gate. Each rule, having three conditions (570, 572, 574), should normally have two 2-input nodes. However, since the first two conditions in both rules share interelements tests (there are none), they can also share a 2-input node 578a that combines tokens from these two conditions (570, 572). Although the final 2-input node 578c does the same work for both rules-that is, it checks that the values bound to the attributes ^id and ^to are the same-separate 2-input nodes are necessary, since they receive inputs from different 1-input nodes on the right.

The TREAT algorithm is another well known pattern matching algorithm. The TREAT algorithm performs pattern matching by a multi-level discrimination network. At the first level of the discrimination network, newly created objects are tested in nodes against programmer-stated values. For example, if a programmer had stated a need to find a shirt that was clean, this would be successfully matched by creation of an object such as SHIRT ^STATE=CLEAN. Lists of all such successful tests are stored in data structures associated with the first level in the network, and as each successful first-level match is completed, the particular object is passed down to the second level.

At the second level, objects which successfully passed the first level are used to query other first-level nodes to obtain mutually consistent tuples. For example, if the programmer stated that he wished to find matches where a pair of pants and a jacket had the same color, this would be satisfied by a tuple such as PANTS ^COOR=BLUE, JACKET ^COLOR=BLUE. This example would not be satisfied if by the inconsistent tuple PANTS ^COLOR=BLUE, JACKET ^COLOR=RED. Whenever a completed and consistent tuple is found, it is sent to the third level. The second level does not retain any information concerning consistent tuple combinations.

The third level holds a list of all completed consistent tuples in order sorted by recency, so that as the conflict resolution system requests completed tuples, they may be fed out in the proper sequence. Not every consistent tuple will necessarily be selected by the conflict resolution, because as the system continues operation an object referenced by a tuple may be deleted before the tuple is actually used. In this case the third level must delete the tuple instead of sending the tuple out.

Whenever an object is removed, only the first and third levels need be informed of the removal, since in TREAT these are the only levels which retain information.

A pattern match algorithm is the primary component of any forward-chaining language like OPS5. RETE and TREAT are two well known pattern match algorithms. The performance of a forward-chaining language is critically dependent upon the pattern match algorithm.

Accordingly, there is a need for a method to avoid the traversal of the entire RETE net and thereby increase overall run-time performance.

OBJECTS AND SUMMARY OF THE INVENTION

It is the general object of the present invention to provide a method of rule execution for expert systems utilizing a reticular discrimination network by declaration partitioning.

It is a more particular object of the present invention to provide a method which involves creating data declarations, indirectly placing a set of these data declarations in a program module, and creating testing element nodes. A unique key is embedded in a data structure which describes how to create any of the data types included in the set of data declarations in the program module. A unique key is also embedded into the testing element node. The testing element is designed such that it contains a number of testing element nodes which contain a list of permitted unique keys of a number of declared data types in a variety of data structures. The unique key is included in the data structure of every created working memory element. The testing element containing testing element nodes act to scan each working memory element for a match of the unique key prior to entering the reticular discrimination network. In the event of a match of unique keys the working memory element (or data object) is passed onto the rest of the reticular discrimination network for that particular program module. Further examination of that particular working memory element is aborted in the event of a failure to match unique keys. This comparison of working memory elements to unique keys, and where appropriate passing those working memory elements down to the reticular discrimination, continues until there are no further working memory elements to compare. All resulting instantiations are added to the conflict sets.

BRIEF DESCRIPTION OF THE DRAWINGS

Other objects and advantages of the invention will become apparent upon reading the following detailed description and upon reference to the drawings in which:

FIG. 2 depicts a simple interelement match without variables.

FIG. 3 depicts an interelement match with variables.

DESCRIPTION OF THE PREFERRED EMBODIMENT

Artificial intelligence reasoning and problem-solving techniques allow expert systems to draw conclusions that were not explicitly programmed into them. They contrast with traditional data processing techniques, which demand input that is certain, use primarily numeric computation in well understood algorithms, and produce answers. Expert systems, on the other hand, use information that is not always entirely consistent or complete, manipulate it by symbolic reasoning methods without following a numeric model and consequently produce satisfactory answers and useful approximations.

Figure 1:
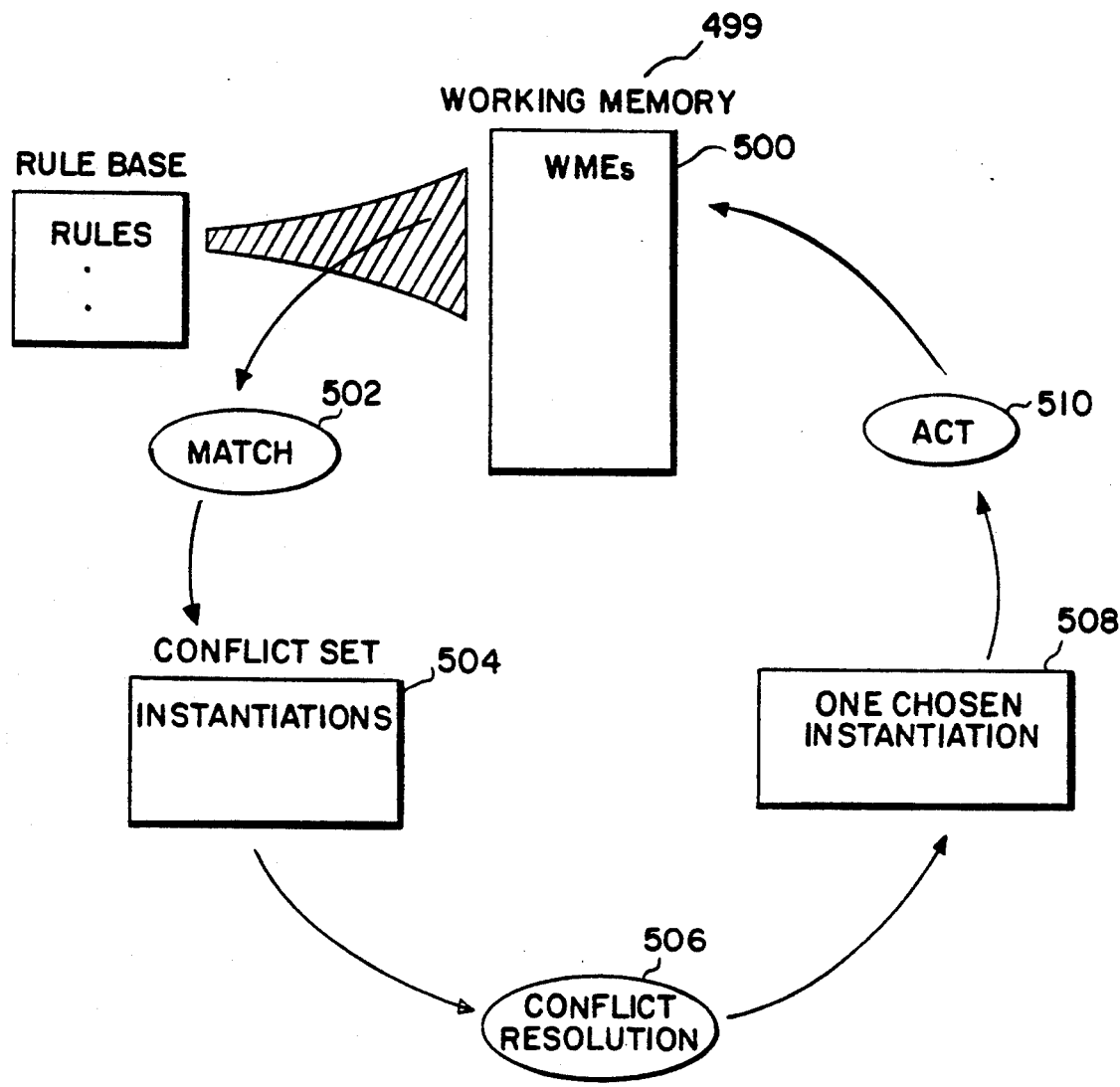
FIG. 1 depicts a flow diagram of an OPS5 recognize-act cycle.
Figure 4:
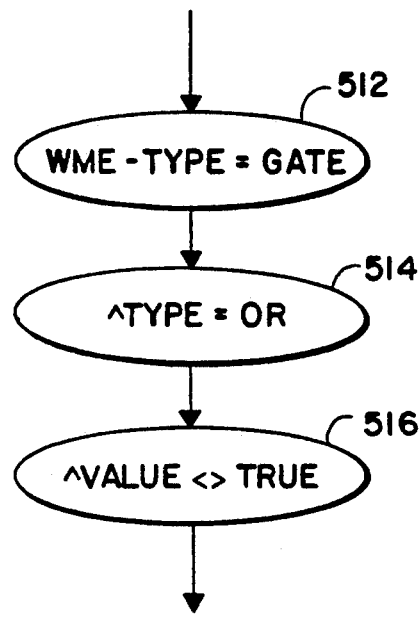
FIG. 4 depicts nodes connected in order of condition element tests.
Figure 5:
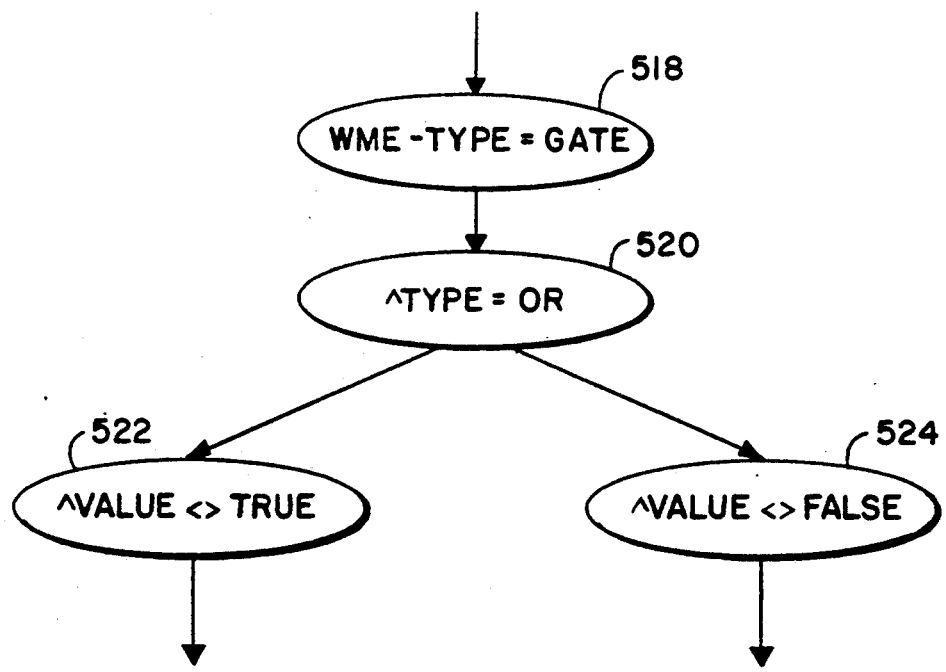
FIG. 5 depicts nodes sharing between two condition elements.
Figure 6:
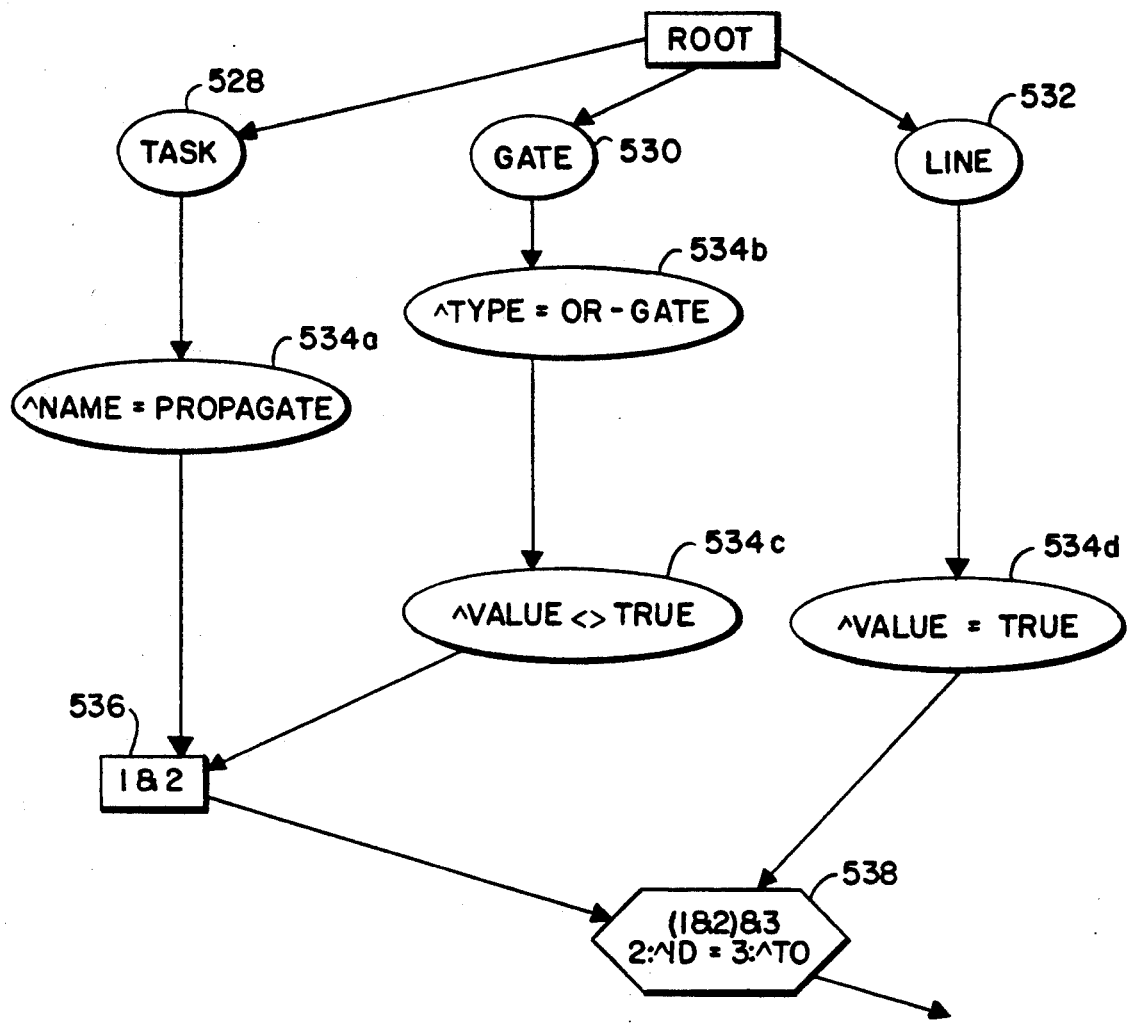
FIG. 6 depicts a simple network of 1- and 2-input nodes.
Figure 7:
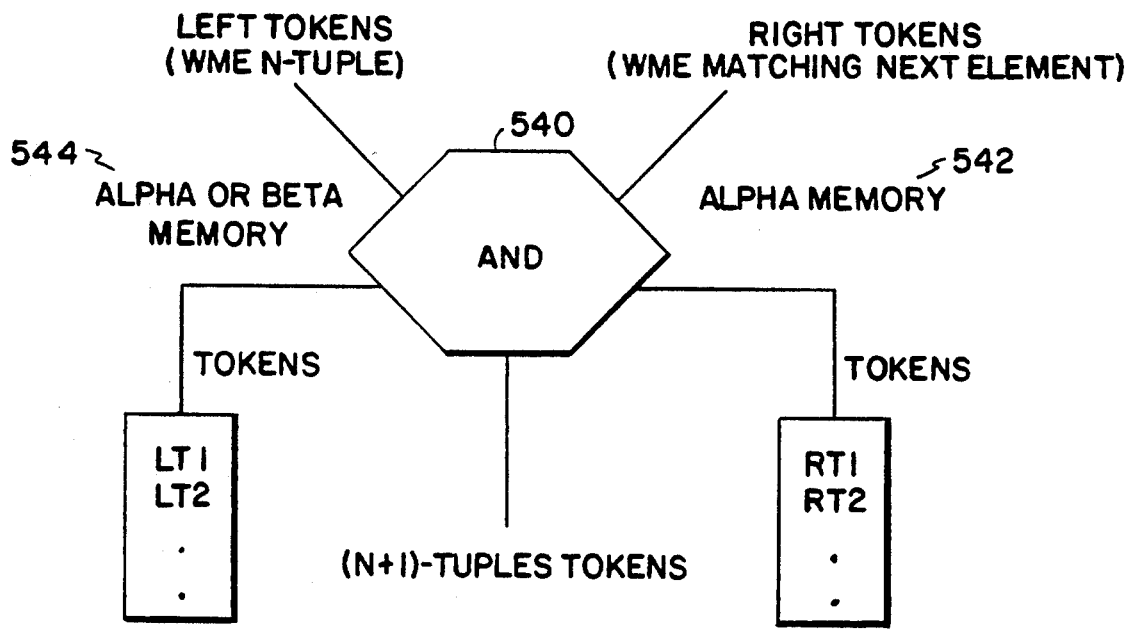
FIG. 7 depicts an AND 2-input node for positive conditions.
Figure 8:
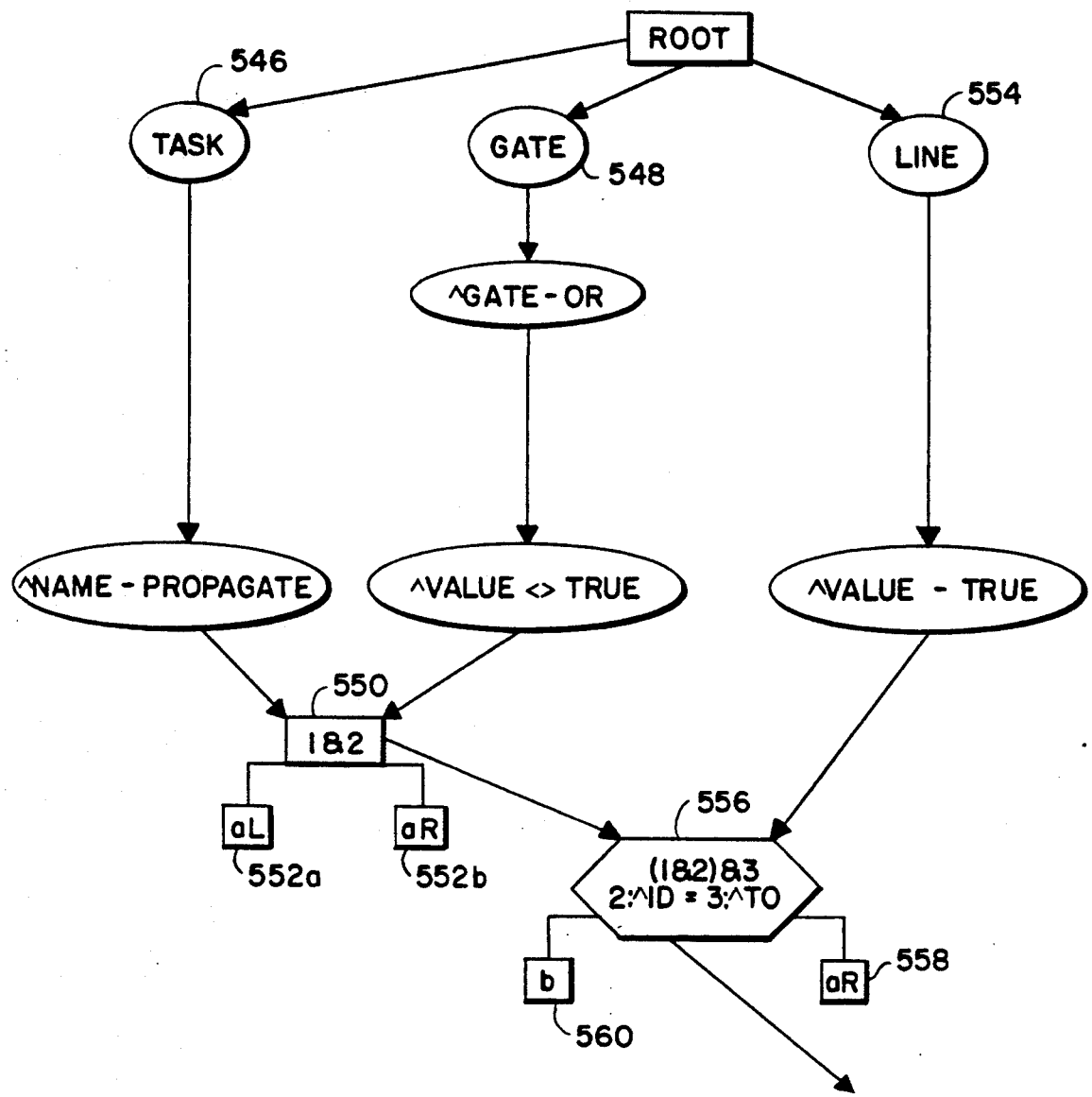
FIG. 8 depicts alpha and beta memories on 2-input nodes.
Figure 9:
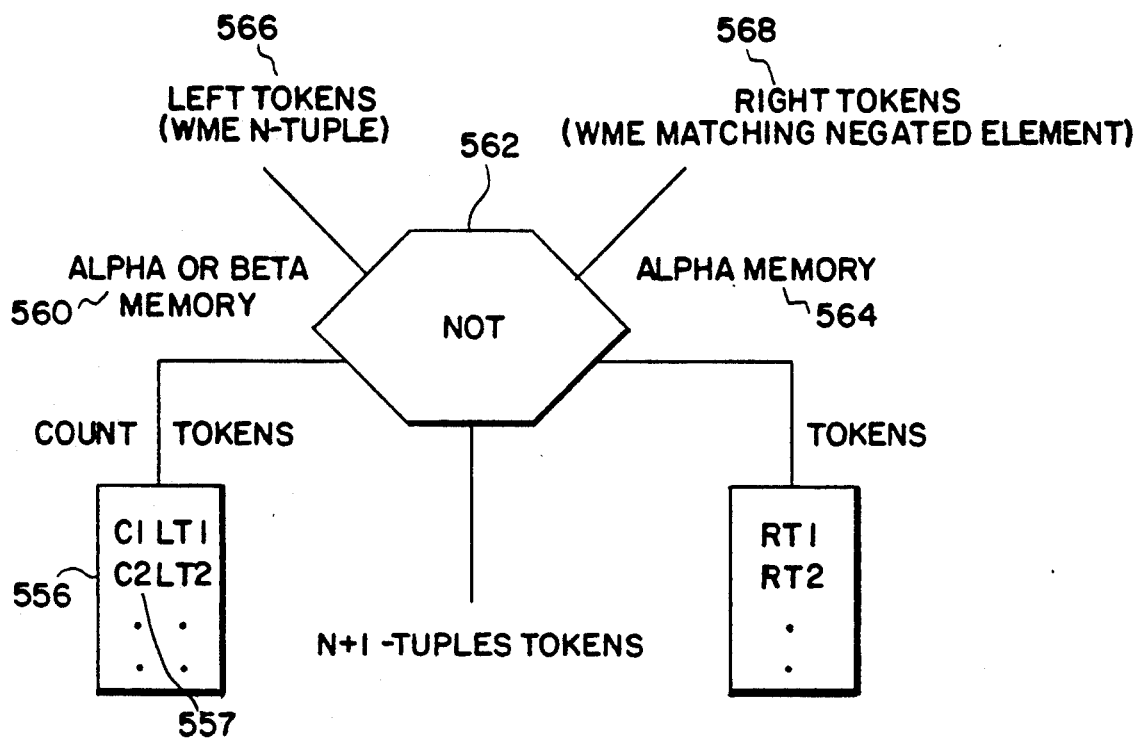
FIG. 9 depicts an NOT 2-input node for negated conditions.
Figure 10:
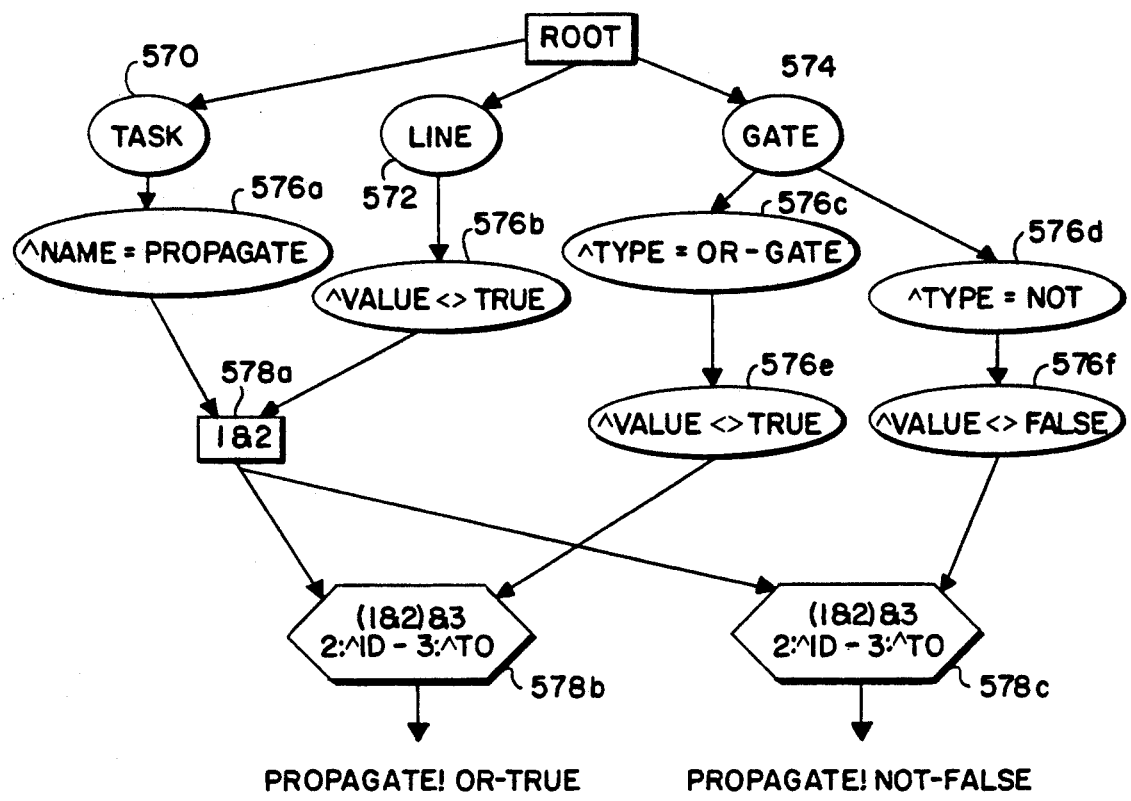
FIG. 10 depicts a match network with 2-input node sharing.
Figure 11:
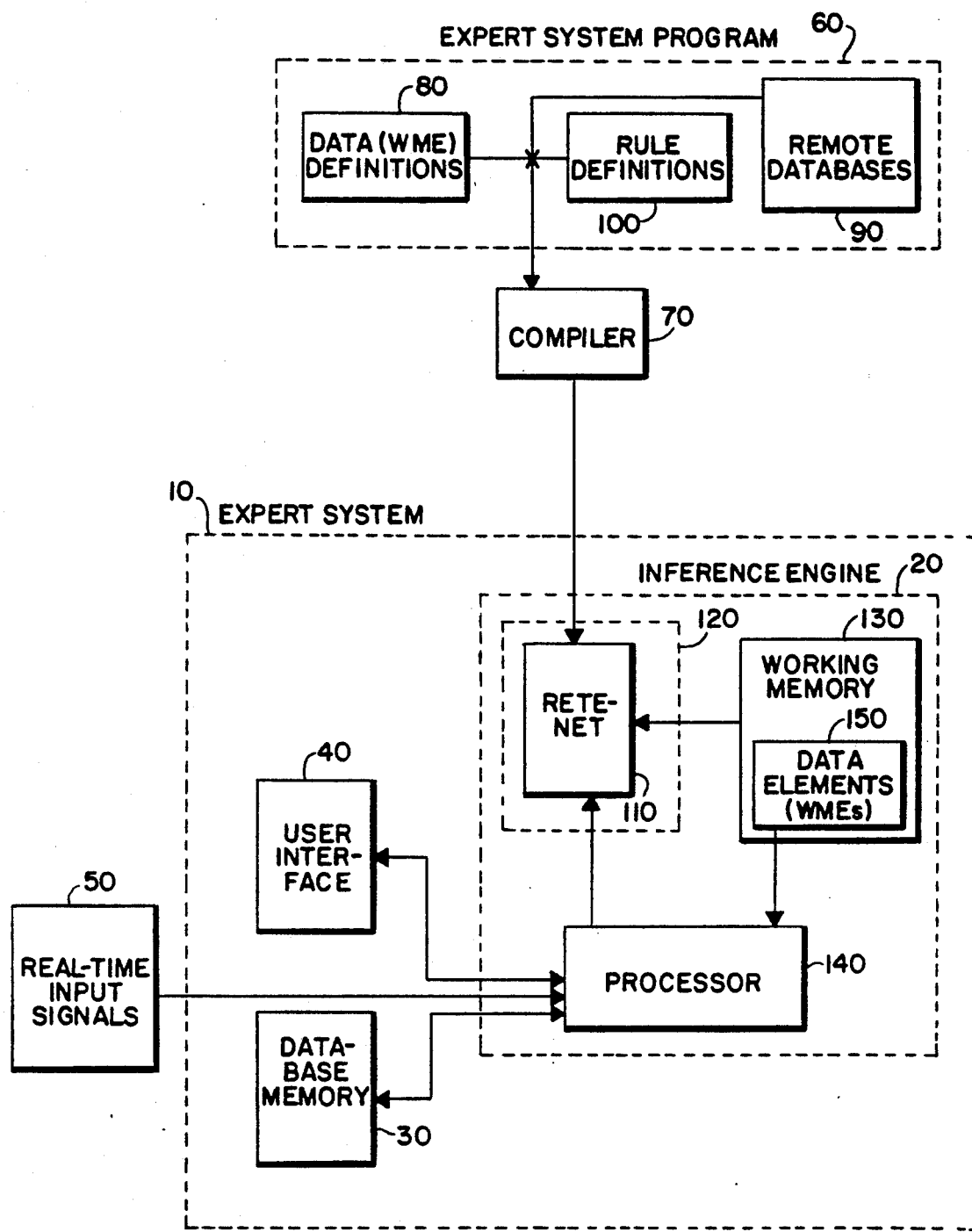
FIG. 11 depicts a block diagram of an expert system.

Referring to the drawings, FIG. 11 depicts an expert system 10. The expert system 10 comprises an inference engine 20, optional database memory 30, and an optional user interface 40. The inference engine 20 is coupled to the database memory 30, an external source to the expert system 10 for real-time input signals 50, as for example an environmental sensor, and user interface 40.

An expert system program 60 through an expert system compiler 70 is used to create the expert system 10. The expert system program 60 comprises optionally, a set of data definitions 80, a set of remote data bases 90, and a set of rules 100. The expert system program 60 may also include links to other programs for performing tasks such as accessing remote data bases 90 when called upon during the execution of the expert system program 60.

The data definitions 80 identify categories of data which the expert system program 60 will use during its operation. The set of rules 100 are coupled to the set of data definitions 80. The data definitions 80 enable the rules to manipulate data.

The compiler 70 processes data definitions 80 and rule definitions 100 to form (in the inference engine 20) a discrimination network data structure known as a reticular discrimination network, i.e. RETE net 110. A data structure is an abstract way of representing data that is independent of a particular implementation. Thus data "trees", like a reticular discrimination network, as well as records or arrays, are data structures.

The inference engine 20 comprises a memory 120, a working memory 130, and a processor 140. The memory 120 and the working memory 130 are coupled to each other and to the processor 140. The processor 140 is coupled to a user interface 40, external real-time input signals 50, and the database memory 30.

The processor 140 obtains data from the database memory 30, the user interface 40 or the real-time input signals 50 by performing initial computations that are specified by data definitions 80 or by executing right-hand sides of rules. This data is stored in working memory 130 by processor 140 as one or more WMEs 150 (also referred to as data elements). Working memory 130 comprises a plurality of data organized as working memory elements (WMEs) 150 that are input to and output from the RETE net 110 by processor 140. A working memory element (WME) 150 identifies one or more data definitions and values for each definition. The data values in each WME 150 are referred to as slots.

The RETE net 110 created by the compiler 70 is stored in memory 120. The RETE net 110 in memory 120 comprises nodes, the nodes comprising test nodes, i.e. 1-input nodes, join nodes, i.e. 2-input nodes, and terminal nodes. 1-input nodes perform single comparison test such as (X>4 for example. 2-input nodes perform two list comparisons representing operations such as comparing a slot in one WME for equality against some slot in another WME.

In operation, whenever new data elements 150 are stored in working memory 130, the processor 140 creates add-tokens for them and applies tokens one at a time to the RETE net 110. Those tokens are processed by a process known as "matching" through the RETE net 110 to determine if one or more rules are applicable to the data stored in working memory 130.

Matching is accomplished by using the RETE Match Algorithm. The RETE Match Algorithm exploits properties common to all production systems in order to reduce the effort of performing the match; first, the content of working memory is very large and second, the contents of working memory changes very little during the execution of any one production. Third, the LHS or IF parts of rules contain many similar, if not identical, patterns. The RETE net serves as a function to map changes in working memory into changes in the set of satisfied productions:

(delta-working memory)→RETE
net→(delta-satisfied-rules)

Figure 12:
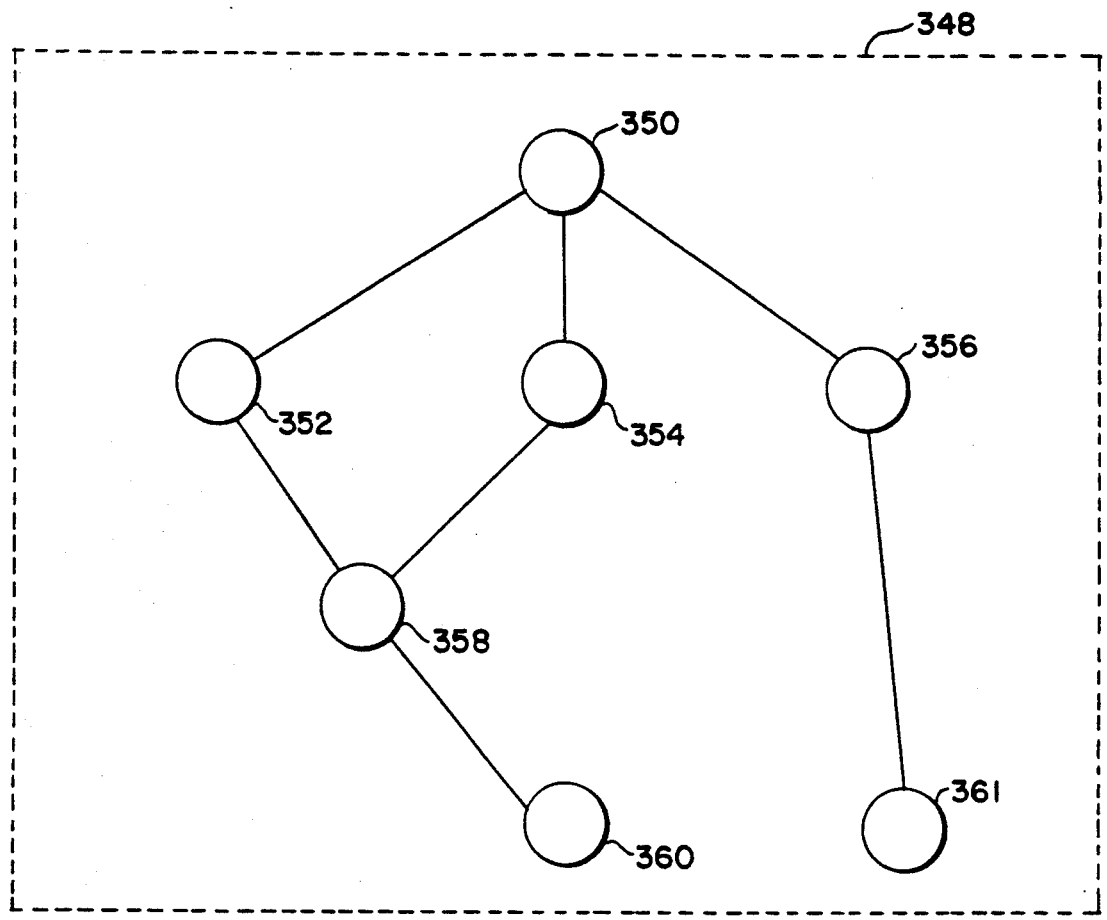
FIG. 12 depicts a segment of a reticular discrimination network.

Referring to FIG. 12, by way of example one node in the RETE net segment 348 is designated the root node 350. Every time an element is added to or deleted from working memory, a data structure called a token is created to describe the change. A token is an ordered pair made up of a tag and a list of data elements. In the simplest implementations of the RETE match algorithm only two tags, +and −, are needed to indicate that something has been added or deleted from working memory.

The token is sent to the root node 350, which processes it. If appropriate, the node creates more tokens and sends them to the nodes connected to it. Each of these nodes processes the token it receives and, if appropriate, creates copies of the token and sends them to the nodes which are connected to it. These nodes may perform various operations related to the match.

A few of the nodes in the RETE net segment 348 are responsible for providing information about the satisfaction of the rule's IF parts and making changes in the set of satisfied rules. When one of these is activated by having a token sent to it, it adds an element to or deletes an element from the set.

The RETE net segment 348 illustrated in FIG. 12 further contains three 1-input nodes (numbered 352, 354, and 356) one 2-input node 358, and two terminal nodes 360 and 361.

A reticular discrimination network would contain a plurality of segments like the one illustrated in FIG. 12. As stated previously, the RETE algorithm provides a method for pattern matching in a reticular discrimination network. By way of example, a new WME would approach the root node 350 in RETE net segment 348. A pattern match test would be initiated and the results passed to one of the 1-input nodes (352, 354, or 356 in FIG. 12) based on the results of the match test. At the 1-input nodes the same match test would be executed. From the 1-input tests tokens would be passed to a 2-input node 358 or a terminal node 360 or 361. At each 1-input and 2-input node a match test is executed. This process of pattern matching continues throughout the entire reticular discrimination in robotic fashion.

The present invention provides a vast improvement in the performance of rule-based systems utilizing a reticular discrimination network by its ability to avoid traversal of large segments of the reticular discrimination network entirely. This method partitions the entire reticular discrimination network into smaller RETE net segments like the one illustrated in FIG. 12. This is accomplished by partitioning the reticular discrimination network into smaller segments according to the declarations contained in each of the nodes in the reticular discrimination.

Figure 13:
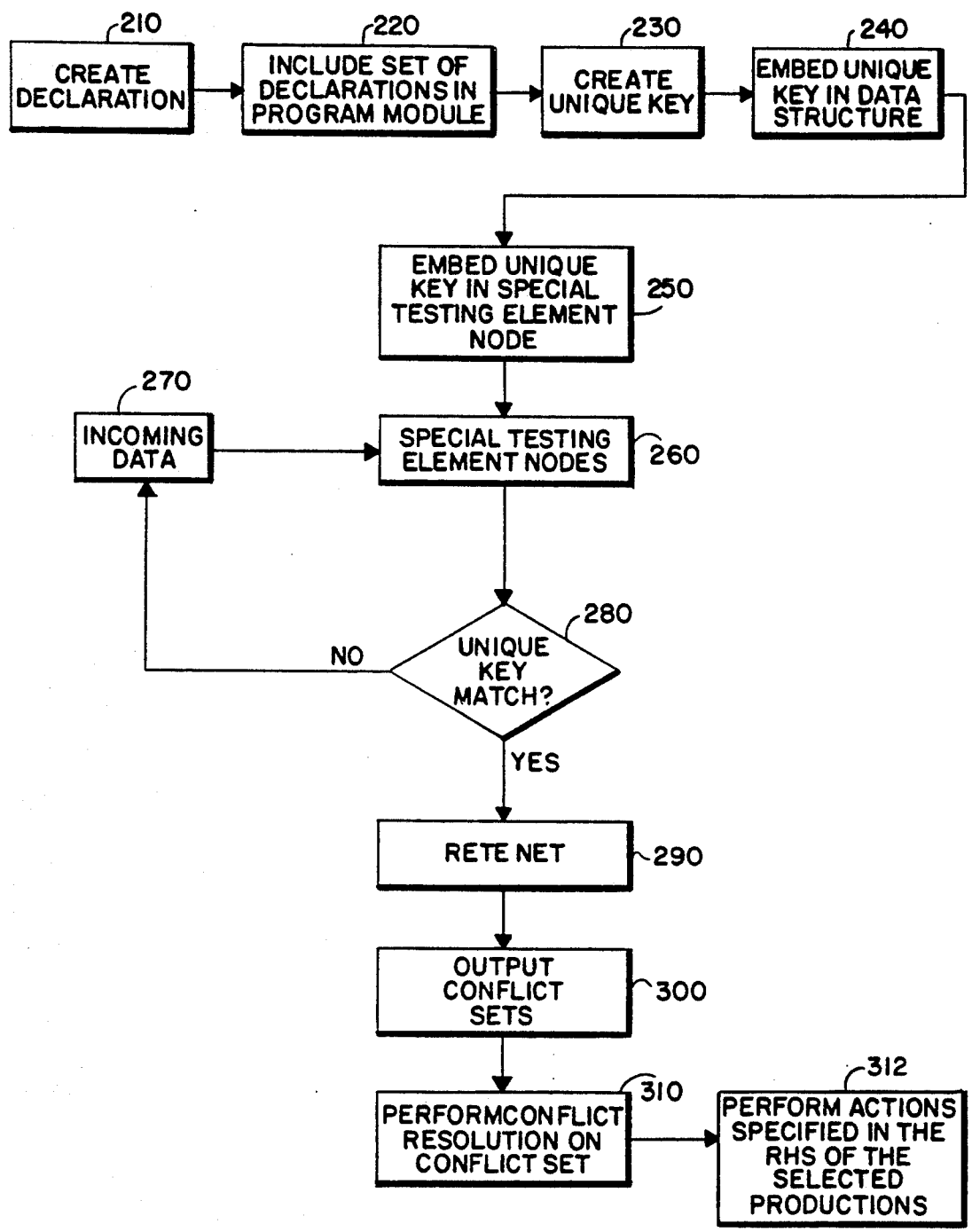
FIG. 13 depicts a block diagram of the method in accordance with the present invention.

Referring to FIG. 13, a block diagram of the declaration partition method of the present invention is illustrated. The method is initiated by creating data declarations at step 210. A set of these data declarations created at step 210 are included in a program module at step 220. These sets of data declarations, as well as "filename", "date and time of last modification", are used to create a unique key at step 230 which identifies the declaring file to a high degree of accuracy. Nodes are grouped or partitioned by associating them with this unique key. A prefiltering testing element node, which contains this unique key, acts as the root node into the partitioned nodes. Alternatively, the unique key created at step 230 can consist of assigning a unique 32-bit or 64-bit integer value to the sets of data declarations at step 220, or providing for each set of data declarations at step 220 a uniquely determined prime number in the range of 0 to $2^{64}$. Alternatively still, the unique key produced at step 230 may be provided by applying a hash function located in the expert system program to other data, such as a source code file length, the source code file checksum, the source code file characteristics, the source code file modification date, the source code file modification time, the source code file creation date, the source code file ownership, the source code file location in a local file system, and/or the source code file location in a networked file system. In effect, the reticular discrimination network is partitioned into smaller segments and a testing element node provides the doorway into that smaller partitioned section.

Therefore, this unique key created at step 230 is used in two places. First, the unique key created at step 230 is embedded in the data structure of the data declarations at step 240, which describes how to create any of the data types declared in the data declarations at step 210. Second, the same unique key created at step 230 is embedded in the testing element node at step 250. A data type is a set of values and a set of operations on those values. For example, the values of an integer type consist of integers in some specified range, and the operations on those values consisting of addition, subtraction, inequality tests, and so forth. Other data types include floating point numbers, pointers, enumerations, arrays, records or structures, unions, functions, rules, etc.

The testing element nodes at step 260 are then situated as to intercept all incoming data at step 270 to the RETE net at step 290 of that module. That is, as the WME contained by the incoming token (containing at this point the tag, and one working memory element) comes in at step 270 and passes the testing element nodes at step 260; if the unique embedded key of the WME contained by the incoming token (i.e. working memory elements (WME's) or data objects) matches the unique key of the testing element node at step 280, the module makes use of the declaration and the testing element node passes the WME to the rest of the RETE net, for that module at step 290. A match of the incoming data with a node in the RETE net then produces a conflict set output at step 300. A conflict set is a collection of order pairs of the form:

<Production-name, List of elements matched by rule's IF part>

Output of the conflict set at step 300 indicates one production with a satisfied LHS. This conflict set output at step 300 then can be used for conflict resolution at step 310 and subsequent firing at step 312.

If the key of the WME does not match the unique key embedded in the testing element nodes, then the module does not know the declaration and the testing elements can abort further examination of that WME by the rest of the modules in the RETE net and the system initiates examination of the next incoming data object at step 270.

Figure 14:
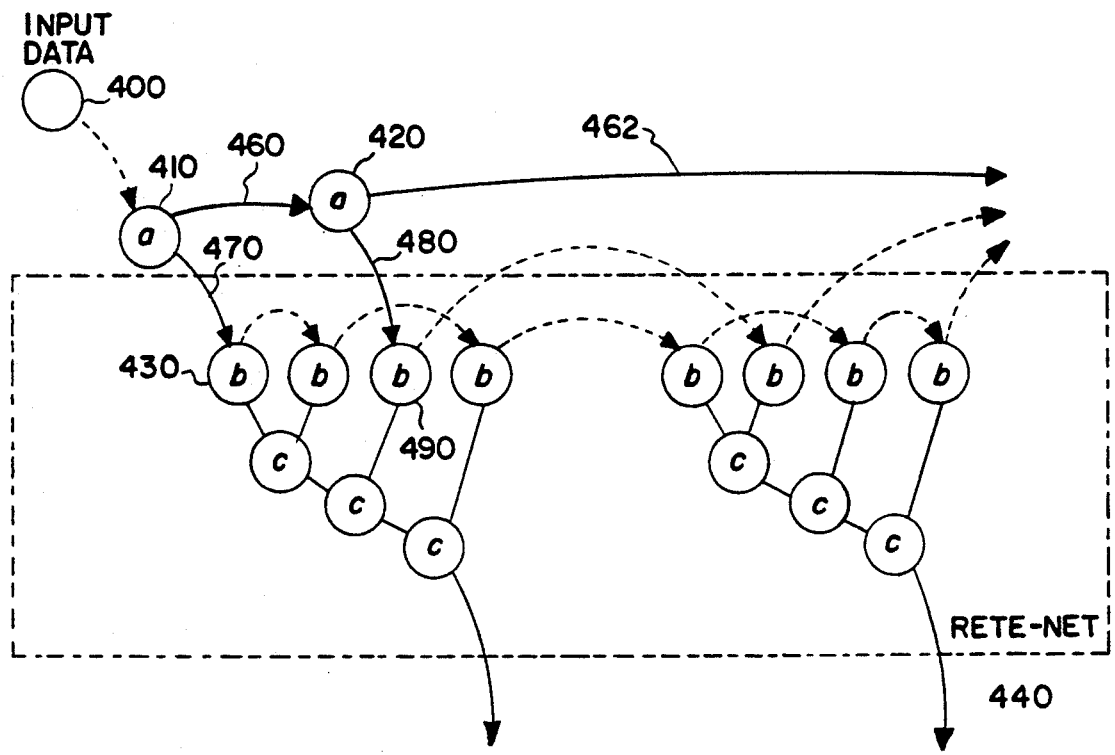
FIG. 14 depicts a reticular discrimination network (RETE net) fragment for one program module showing how the present method interrogates incoming working memory elements via testing element nodes.

Referring to FIG. 14, a detailed diagram of the present method is illustrated. By way of example, two testing element nodes (each indicated as a) are illustrated, as well as eight 1-input nodes (each indicated as b) and six 2-input nodes (each indicated as c) that make up part of the RETE net 440 segment.

Input data (tokens, each of which at this point contains one WME) 400 approaches the RETE net 440 segment for the program module. Prior to contacting any 1-input node b the input data 400 is interrogated by testing element node 410. If the unique key of the input data 400 matches the unique key of the testing element node 410, it is passed along path 470 on to the 1-input node 430 of the RETE net 440. If the keys do not match, the input data is passed along path 460 to the next testing element node 420. Again, if the unique key of the input data 400 matches the unique key of the testing element node 420, the object is passed along path 480 on to 1-input node 490 of the RETE net. If there is no match, the object is passed along path 462 and examination of this instance of incoming input data 400 is complete. This process of object data being interrogated by the testing element nodes occurs repetitively until there are no more testing elements. Upon testing element by that segment of the RETE net exhaustion, the system can abort further examination of that input data 400 and accept the next incoming input data.

While there has been shown and described a preferred embodiment, it is to be understood that various other adaptations and modifications may be made within the spirit and scope of the invention.

What is claimed is:

1. A method of rule execution for an expert system comprising the steps of:
   a. storing in a computer memory a plurality of nodes arranged in a match discrimination network;
   b. allocating program modules in said computer memory, said program modules having data declarations containing at least one of a plurality of data types;
   c. providing to said match discrimination network a testing element containing at least one testing element node, said testing element node containing a test in accordance with said data declarations; and
   d. associating said plurality of nodes of said match discrimination network into at least one group having a first one of said nodes coupled to said testing element node in said testing element in accordance with said test associated with said test node.

2. The method of claim 1 wherein said data declarations contain at least one unique key.

3. The method of claim 2 wherein said at least one of unique key is coupled to said corresponding testing element node.

4. The method of claim 2 wherein said unique key comprises a 32 bit integer value.

5. The method of claim 2 wherein said unique key comprises a 64 bit integer value.

6. The method of claim 2 wherein said unique key comprises a uniquely determined prime number in the range of 0 to $2^{64}$.

7. The method of claim 6 wherein said uniquely determined prime number is provided by the step of:
   using a hashing function located in the expert system program with at least a first one of:
   a. a source code file length;
   b. said source code file checksum;
   c. said source code file characteristics;
   d. said source code file modification date;
   e. said source code file modification time;
   f. said source code file creation date;
   g. said source code file ownership;
   h. said source code file location in a local file system; and
   i. said source code file location in a networked file system;
   to provide said unique key.

8. The method of claim 2 wherein said unique key is provided by the step of:
   using a hashing function located in the expert system program with at least a first one of:
   a. a source code file length;
   b. said source code file checksum;
   c. said source code file characteristics;
   d. said source code file modification date;
   e. said source code file modification time;
   f. said source code file creation date;
   g. said source code file ownership;

h. said source code file location in a local file system; and i. said source code file location in a networked file system;

to provide said unique key.

9. The method of claim 1 wherein said step of providing said testing element allocates a plurality of said testing element nodes.

10. The method of claim 1 wherein said step of storing in said computer memory a plurality of nodes arranged in a match discrimination network in computer memory further comprises the step of providing a working memory in said computer memory, said working memory divided into a plurality of working memory elements associated with each of said program modules, each working memory element containing a unique key, wherein said method further comprises the step of:

passing selected ones of said working memory elements through said testing element to the first one of said plurality of nodes in accordance with an associated key of each of said working elements and the at least one key of said testing element.

11. The method of claim 10 wherein said step of passing said selected ones of working memory elements to said at least one testing element node in said testing element further comprises the steps of:

i. comparing in said at least one testing element node a unique key of a first one of said working memory elements with a unique key of said testing element node;

ii. passing said first working memory element onto said match discrimination network if said unique key of said first working memory element and said unique key of said testing element node match;

iii. aborting further providing of said first incoming working memory element for a failure to match said unique key of said first working memory element and said unique key of said testing element node;

b. continuing said providing of succeeding ones of said incoming working memory elements until there are no further working elements to compare; and c. outputting the matches as a conflict set.

* * * * *